United States Patent [19]

Judd

[11] 4,154,007
[45] May 15, 1979

[54] DEMONSTRATION CALCULATOR FOR CLASSROOM USE AND THE LIKE

[76] Inventor: Wallace P. Judd, 322 College Ave., Apt. D, Palo Alto, Calif. 94306

[21] Appl. No.: 835,416

[22] Filed: Sep. 21, 1977

[51] Int. Cl.² ............................................. G09B 19/00
[52] U.S. Cl. .................................... 35/39; 35/6; 35/30; 340/711; 35/DIG. 3; 340/757
[58] Field of Search ...................... 35/39, 31 R, 6; 340/336, 337

[56] References Cited

U.S. PATENT DOCUMENTS

| | | | |
|---|---|---|---|
| 2,841,889 | 7/1958 | Coale et al. | 35/39 |
| 3,740,717 | 6/1973 | Huener et al. | 340/336 X |
| 3,789,388 | 1/1974 | Medwin | 340/336 |

Primary Examiner—William H. Grieb
Attorney, Agent, or Firm—Thomas H. Olson

[57] ABSTRACT

An electronic calculator having a liquid crystal display (LCD) which is supported on a transparent substrate so that light from an overhead projector or the like can be transmitted through the display to create an enlarged image of the numerals in the display that are made opaque by proper excitation of the LCD. A calculator supplied with such modified LCD wherein the rear surface of the LCD is parallel to the rear surface of the calculator case so that the case can be placed upon the projection plane of a conventional overhead projector, thereby permitting an instructor to manipulate the input keys to the calculator while simultaneously affording an enlarged view of the LCD to others in the classroom.

3 Claims, 3 Drawing Figures

U.S. Patent  May 15, 1979  4,154,007
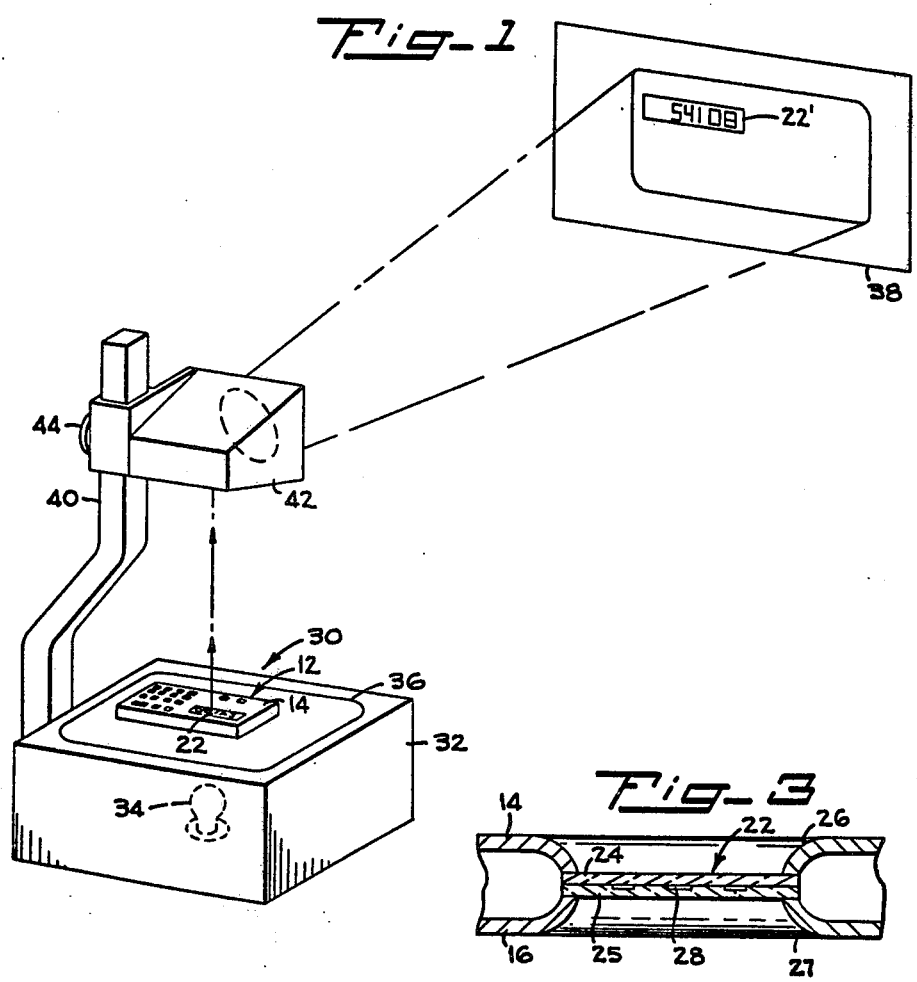

DEMONSTRATION CALCULATOR FOR CLASSROOM USE AND THE LIKE

BACKGROUND OF THE INVENTION

1. Field of the Invention

This invention relates to a hand-held calculator having a liquid crystal display supported on a transparent substrate so that portions of the LCD that are excited obstruct light passage while the reminder of the display is transparent to transmit light therethrough so as to afford projection of an enlarged image of the display onto a projection screen.

2. Description of the Prior Art

So far as is known, the only devices available for facilitating classroom instruction in the operation of a calculator are calculators having displays of large-emitting diodes, large Nixie tubes, or a simulated display having mechanical plates or bars which produce an output display that only remotely resembles the display actually seen on the conventional hand-held calculator. These devices in addition to producing a display unsuited for group viewing are of such high cost that their universal use is impractical.

SUMMARY OF THE INVENTION

According to the present invention an LCD is provided by sandwiching between two transparent sheets suitable liquid crystal material that becomes opaque on excitation. This should be distinguished from the conventional liquid crystal display wherein one surface of the sandwich structure is silvered or otherwise made reflective so that ambient light entering through the front surface is reflected back through the front surface. Thus, the output of a calculator having a display according to the present invention can be projected at enlarged size on a projection screen so as to be visible to a large number of observers.

Accordingly, it is an object of the invention to provide a calculator adapted so that the output thereof can be readily projected for group viewing by use of equipment frequently available in most classroom environments. The foregoing object is achieved by the present invention because the transparent display permits group viewing of the display without interfering with manipulation of the input keys by the instructor.

A feature and advantage of a calculator provided with a display according to the invention is that by projecting its output on a screen suitable for group viewing, members of the group can follow each of the sequences of operations, thereby facilitating understanding of the operations.

A further feature and advantage is that the instructor can manipulate the input keys of the calculator without interruptions such as would be necessary in holding up the calculator for viewing by the group. This feature and advantage flows from the fact that the calculator incorporating the invention is adapted to be placed on a generally horizontal screen of a conventional overhead projector and there be retained throughout all manipulations of the calculator input keys.

Another object is to provide a method for demonstrating calculator usage by providing a transparent LCD for the calculator output and supporting the calculator on a projector stage during manipulation of the input keys thereof.

The foregoing, together with other objects, features and advantages will be more apparent after referring to the following specification and the accompanying drawings.

BRIEF DESCRIPTION OF THE DRAWINGS

FIG. 1 is a perspective view of a calculator according to the invention employed in connection with an overhead projector to afford group display of the calculator output.

FIG. 2 is a front view of a calculator employing a liqiud crystal display according to the invention.

FIG. 3 is a cross-sectional veiw taken at enlarged scale along line 3—3 of FIG. 2.

DESCRIPTION OF THE PREFERRED EMBODIMENT

Referring more particularly to the drawings, reference numberal 12 generally indicates a hand-held calculator of more or less conventional form. The calculator has a front opague panel 14 and a rear opaque panel 16 which cooperate to form a case in which the operative circuit elements and battery power supply are housed. Panel 14 is provided with input pushbuttons or keys 18 which afford numerical and function inputs to the circuitry within the case. Panel 14 is also provided with a power switch 20 and an output display 22. Output display 22 in a calculator incorporating the present invention is a liquid crystal display as contrasted with an LED display. When segments of a liquid crystal display are electrically excited, they become opaque.

Liquid crystal display 22 is composed of upper and lower transparent plates 24 and 25, respectively, which are sandwiched together as seen most clearly in FIG. 3. Panels 14 and 16 are formed with congruent aligned openings 26 and 27, respectively, in which transparent plates 24 and 25 are mounted so as to establish a light transmission path through display 22. One of the plates, plate 25 in the exemplary display shown in the drawing, contains excisions or troughs exemplified at 28; the throughs each contain a pool of liquid crystal material and are configured in sets of seven linear elements in the shape of a FIG. 8 as is conventional. Conductive paths (not shown) extend to each of the liquid crystal pools in the respective troughs to afford excitation from the calculator circuitry within the case so as to display output numerals on display 22. As is known, excitation of the elements in a liquid crystal display causes the excited element to become relatively opaque to light transmission. The output shown in the drawing displays opaque regions in the form of the numeral 54108, the remaining portions of the display being transparent.

The liquid crystal display is preferably parallel with lower surface of panel 16 for reasons which will become apparent. Liquid crystal display 22 provides a transparent or light transmission path through the entire calculator case which is interrupted only by those elements of the liquid crystal display that are excited as to render them opaque.

In FIG. 1, an overhead projector of more or less conventional form is identified at 30. The projector includes a base housing 32 which includes a light source 34 and a transparent or translucent stage 36 which is adapted to support sheets, the content of which is to be projected at enlarged size on a screen or the like, such as indicated at 38.

Extending upward from base 32 is a support post 40 on which is supported an optical system 42 which includes a reflector for reflecting the image produced on stage 36 onto projection screen 38. Optical system 42 includes means 44 for adjusting the height thereof as may be required to focus the image on screen 38.

In operation, calculator 12 is placed on viewing stage 36, light source 34 is activated and optical system 42 is adjusted to produce a clear imge 22' on screen 38. Such image is typically constituted by a background that corresponds to the color of projection screen 38 in which are projected images of the opaque numerals formed on liquid crystal display 22.

As can be seen in FIG. 1, front panel 14 of calculator 12 is accessible to the instructor who can discuss the operations being performed by him as well as performing the described operations. Throughout the performance of the operations the output, as displayed by display 22, is projected on screen 38 so that members of a classroom group can follow the results of the operations being described and performed by the instructor.

To recapitulate, there is first provided an electronic calculator that has a liquid crystal display formed within a transparent planar structure which is parallel to the plane of bottom panel 16 of the calculator case. Also provided is an overhead projector as exemplified in FIG. 1 at 30. Next, the calculator is placed on the viewing stage 36 of the overhead projector, thus transmitting light energy through the display. The excited portions of the liquid crystal display are opaque, thereby obstruction passage of the light through the otherwise transparent member in a shape corresponding to the digits formed on the display. Finally, the image so produced is magnified and projected on screen 38 as at 22'. Throughout performance of the foregoing steps, front panel 14 and the input pushbuttons or keys are conveniently accessible to the operator of the device.

Thus, it will be seen that the present invention provides a hand-held calculator and a method for employing the calculator to afford demonstration of manipulation of the calculator to the members of a large group. In achieving this, the calculator is provided with a display that is transparent so as to permit transmission of light therethrough. The transparent display includes liquid crystal segments which when electrically excited in an appropriate pattern produce output digits that are opaque. The projection system utilized in practicing the invention thus produces images on a screen which have a shape corresponding to the digits so as to afford group viewing of the results of manipulations on the calculator.

Although one embodiment of the invention has been shown and described, it will be obvious that other adaptations and modifications can be made without departing from the true spirit and scope of the invention.

What is claimed is:

1. A method for demonstrating manipulation of an electronic calculator comprising the steps of providing a calculator having a front panel from which input pushbuttons are accessible and having an opening therethrough, a rear panel opposite the front panel and having an opening therethrough in registry with the front panel opening and a liquid crystal display aligned with the openings for displaying a readout for the calculator responsive to operations performed thereby, forming the display on a transparent substrate intermediate the front and rear panel and substantially parallel to the rear panel so as to afford light transmission placing the rear panel on the stage of an overhead projector so as to cause light transmission through the display, reflecting and enlarging the image produced by such light transmission onto a screen, and manipulating the pushbuttons of the calculator while projecting the output thereof onto the screen.

2. A calculator for use in conducting classroom demonstrations of the operation thereof comprising a housing having front and rear opaque panels, a plurality of pushbuttons accessible from the front panel for affording introduction of data into the calculator, means in the calculator for processing the data supplied thereto from said pushbuttons, and display means for displaying the output of said data processing means, said display means being spaced inward of the periphery of the housing and including first and second transparent sheets supported in said housing, said housing forming an opening inward of the periphery thereof for said sheets to establish a light path therethrough from said rear panel to said front panel, liqiud crystals portions between said sheets adapted to form numeric outputs that are opaque so as to obstruct light transmission therethrough when said liquid crystal portions are excited, and means for transmitting a light beam through said display for forming an enlarged image thereof.

3. A calculator according to claim 2 in combination with a projector having a stage for supporting a medium to effect projection of the medium, said transparent sheets in said calculator being parallel to said read panel so that upon placement of said rear panel on said stage an image of said display is projected by said projector.

* * * * *